United States Patent [19]

Wakui

[11] Patent Number: 5,640,203
[45] Date of Patent: Jun. 17, 1997

[54] RECORDING OPERATION CONTROL DEVICE

[75] Inventor: Yoshio Wakui, Tokyo, Japan

[73] Assignee: Asahi Kogaku Kogyo Kabushiki Kaisha, Tokyo, Japan

[21] Appl. No.: 389,238

[22] Filed: Feb. 15, 1995

[30] Foreign Application Priority Data

Feb. 16, 1994 [JP] Japan .................................. 6-041869
Feb. 23, 1994 [JP] Japan .................................. 6-049716

[51] Int. Cl.$^6$ .................................................. H04N 5/225
[52] U.S. Cl. ........................... 348/231; 358/906; 386/120; 386/121
[58] Field of Search ............................ 348/231, 233; 358/335, 906; 360/33.1

[56] References Cited

U.S. PATENT DOCUMENTS

| 4,489,351 | 12/1984 | D'Alayer De Costemore D'Arc | 348/233 |
| 5,067,029 | 11/1991 | Takahashi | 348/231 |
| 5,111,299 | 5/1992 | Aoki et al. | 358/335 |
| 5,153,730 | 10/1992 | Nagasaki et al. | 358/335 |
| 5,262,868 | 11/1993 | Kaneko et al. | 348/233 |
| 5,303,198 | 4/1994 | Aedachi et al. | 365/218 |
| 5,473,370 | 12/1995 | Moranaga et al. | 348/231 |

FOREIGN PATENT DOCUMENTS

5-91455  4/1993  Japan .

*Primary Examiner*—Wendy Garber
*Attorney, Agent, or Firm*—Greenblum & Bernstein P.L.C.

[57] ABSTRACT

A recording operation control device has a plurality of slot units in which, for example, an IC memory card is mounted. IN a plural record mode, the same image signal is recorded to a plurality of IC memory cards through the slot units. An output voltage of a battery applied to the slot units is detected. When the output voltage of a battery is greater than or equal to a reference voltage in the plural record mode, the slot units are controlled in such a manner that the image signal is simultaneously recorded to the IC memory cards. When the output voltage is less than the reference voltage, the slot units are controlled in such a manner that the image signal is sequentially recorded to each of the IC memory cards.

10 Claims, 10 Drawing Sheets

RECORDING OPERATION CONTROL DEVICE

BACKGROUND OF THE INVENTION

1. Field of the Invention

The present invention relates to an electronic still video camera by which a still image signal obtained through an imaging device, such as a CCD, is recorded in a recording medium, such as an IC memory card.

2. Description of the Related Art

An electronic still video camera to which a plurality of IC memory cards can be mounted is disclosed in Japanese Unexamined Patent Publication No. 5-91455. This electronic still video camera is provided with two slots, each slot mounting an IC memory card, and senses a remaining recordable capacity in each IC memory card so that an image signal is recorded in one of the IC memory cards.

In the conventional electronic still video camera described above, the image signal representing one image may be recorded only in one of the IC memory cards during each photographing operation. Therefore, when a photographer wants to record an image signal to more than one IC memory card, or to a different recording medium, the image signal must be recorded to one of the IC memory cards mounted in the camera, and then subsequently dubbed to another IC memory card or recording medium, which is a cumbersome operation.

Further, since such an electronic still video camera has fewer mechanical parts than a usual camera, it is suitable for high speed continuous operation in which an object image is sequentially recorded repeatedly with a constant time interval. Hence, by using an electronic still video camera in which a plurality of IC memory cards can be mounted as described above, a continuous recording operation can be carried out, by which a large number of images can be recorded.

However, in such an electronic still video camera, if a voltage is applied to all of the card slots continuously while in a continuous record mode, a power supply, such as a battery, will be discharged quickly. This is a serious problem in that the recording operation will become impossible to complete due to over consumption of the battery.

SUMMARY OF THE INVENTION

Therefore, one of the objects of the present invention is to provide a recording operation control device in which the same image signal can be recorded in a plurality of recording mediums during a photographing operation, eliminating the need for a dubbing operation after the photographing operation.

According to the present invention, there is provided a recording operation control device comprising recording means and control means. The recording means records an image signal corresponding to one object in at least one recording medium. The control means controls the recording means by a single recording operation, when in a single record mode, in which the image signal is recorded in one recording medium, or a plural record mode, in which the image signal is recorded in a plurality of recording mediums. Further, the recording means has a plurality of slot units in which a recording medium can be mounted. The recording medium may be any one of: an IC card; a magnetic disk; or, a magneto-optical disk.

Another object of the present invention is to provide a recording operation control device by which the consumption of the power supply in the continuous record mode is reduced during continuous recording operations.

According to the present invention, there is provided a recording operation control device having first and second recording means, applying means, detecting means and control means. The first and second recording, means record respectively, an image signal in a recording medium. The first and second recording means can record the image signal when a voltage is applied thereto. The applying means applies a voltage to the first and second recording means. The detecting means detects the remaining recordable capacity of a recording medium in which an image signal is being recorded by the first or second recording means. The control means controls the applying means in such a manner that, when the remaining recordable capacity reaches a predetermined amount while the first recording means is recording an image signal, a voltage is applied to the second recording means.

Optionally, the first and second recording means are slot units in which a recording medium can be mounted, respectively.

BRIEF DESCRIPTION OF THE DRAWINGS

The present invention will be better understood from the description of the preferred embodiments of the invention, as set forth below, together with the accompanying drawings in which.

DESCRIPTION OF THE PREFERRED EMBODIMENTS

The present invention will now be described with reference to embodiments shown in the drawings.

Figure 1:
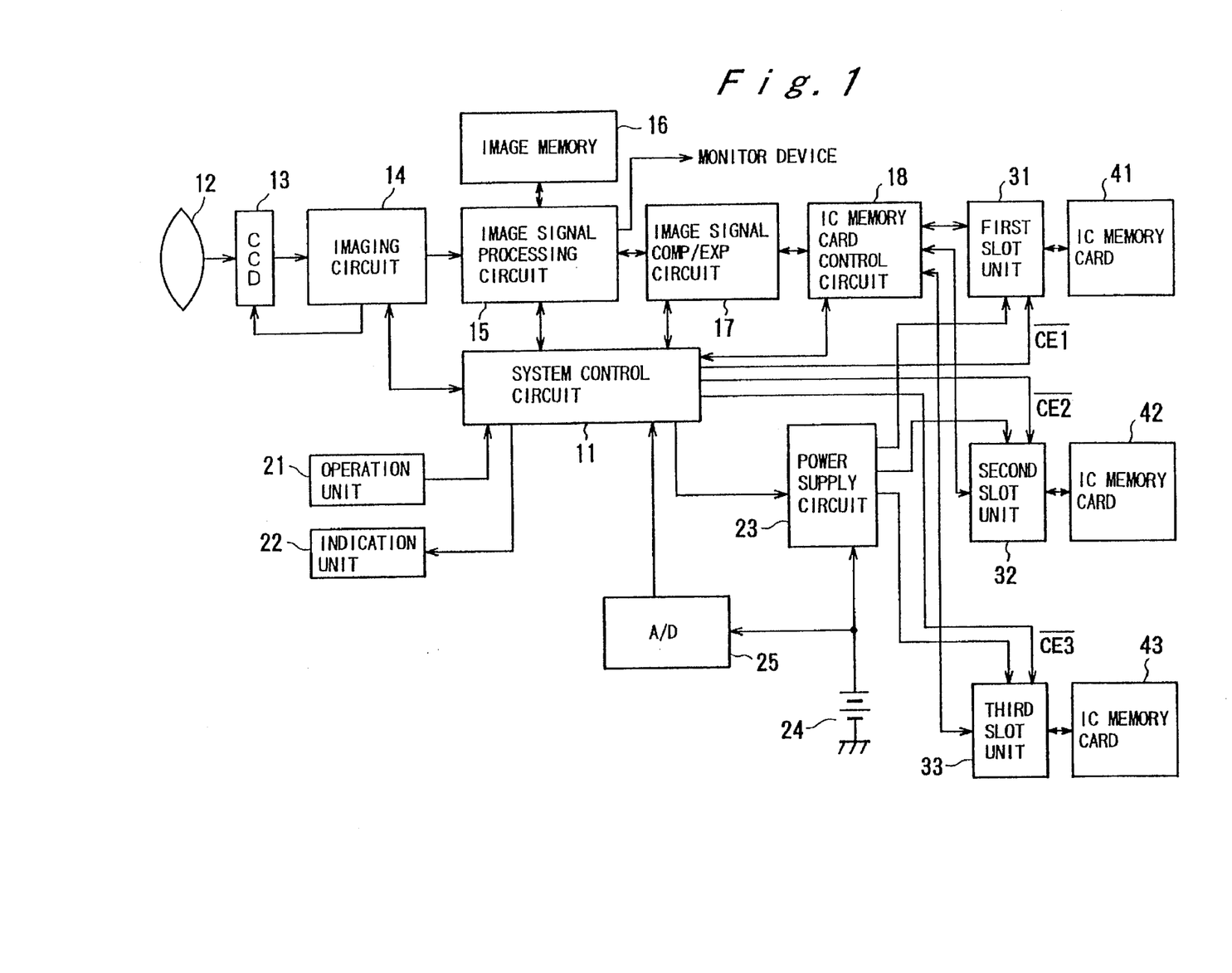
FIG. 1 is a block diagram of an electronic still video camera of a first embodiment of the present invention.

FIG. 1 is a block diagram of an electronic still video camera of a first embodiment of the present invention. This electronic still video camera can be operated in accordance with a plurality of modes, and is controlled by a system control circuit 11.

Light reflected from an object passes through a lens 12, and an image corresponding to the object is formed on a CCD (charge coupled device) 13. The CCD 13 is controlled by an imaging circuit 14, so that an image signal can be read from the CCD 13. This image signal is subjected to predetermined processing in the imaging circuit 14, an image signal compression-expansion circuit 17 and other circuits. The image signal is then recorded to one of the IC memory cards 41, 42 and 43 through one of the slot units 31, 32 or 33 when a usual record mode (i.e., a single record mode) is selected, or is recorded in all of the IC cards 41, 42 and 43 through the first, second and third slot units 31, 32 and 33 when a plural record mode is selected.

The image signal is read from the CCD 13 and is inputted into the imaging circuit 14 at a constant frequency (usually approximately 60 Hertz). The image signal is converted to an R-signal, a G-signal and a B-signal in the imaging circuit 14. These three signals are then converted to a luminous signal Y and differential color signals Pr and Pb by an image signal processing circuit 15.

In the moving image monitor mode, the signals Y, Pr and Pb obtained based on the signals generated by the imaging circuit 14 are transmitted from the image signal processing circuit 15 to a monitor device (not shown) as a moving image signal.

In the still image record mode, the signals Y, Pr and Pb outputted from the image signal processing circuit 15 are temporarily stored in an image memory 16. The signals are later read from the image memory 16 to be compressed by the image signal compression-expansion circuit 17, with a compression ratio which is set through a switch provided in an operation unit 21 connected to the system control circuit 11. The compressed image signal is outputted to an IC memory card control circuit 18, in which an address signal, for designating an area where the image signal is to be recorded and a writing pulse for writing the image signal in that area, is generated. In accordance with the address signal and the writing pulse, the compressed image signal is recorded in one or all of the IC cards 41, 42 or/and 43, depending on whether the usual record mode or the plural record mode is selected.

In the still image reproduction mode, the compressed image signals recorded in the IC card 41, 42 or 43 are read therefrom in accordance with the address signal and a read pulse outputted from the IC memory card control circuit 18. The compressed image signal is expanded by the image signal compression-expansion circuit 17. Image signal expansion is done by the compression-expansion circuit 17 at the same ratio by which it was compressed. The expanded image signal is temporarily stored in the image memory 16, then output to the monitor device (not shown) through the image signal processing circuit 15.

The IC memory cards 41, 42 and 43 are electrically connected to connector pins provided in each of the slot units 31, 32 and 33. Namely, the image signal is written to the IC memory card(s) 41, 42 and/or 43, and read therefrom, through the connector pins of the slot units 31, 32 and/or 33.

A card enable signal $\overline{CE1}$ is output from the system control circuit 11 to the first slot unit 31. When signal $\overline{CE1}$ is at a low state L, the first slot unit 31 is operable, and when signal $\overline{CE1}$ is at a high state It, the first slot unit 31 is non-operable.

Similarly, card enable signals $\overline{CE2}$ and $\overline{CE3}$ are output from the system control circuit 11 to the second and third slot units 32 and 33.

The battery 24 is the power source for this electronic still video camera. The output voltage of the battery 24 is A/D converted by an A/D converter 25, and is sensed by the system control circuit 11. A power supply circuit 23 is connected to the battery 24 and the first, second and third slot units 31, 32 and 33 so that the voltage outputted from the battery 24 is applied to the slot unit 31, 32 and 33. Therefore, the first slot unit 31 can perform recording and reproduction operations when voltage is applied by the power supply circuit 23 and the card enable signal $\overline{CE1}$ is low (L).

The operation unit 21 includes: a release button pushed by a photographer when an image is to be recorded; a record mode input switch used for setting a record mode; and a compression ratio set switch used for setting the compression ratio when recording an image in the memory cards. An indication unit 22 has a record mode indicating unit and a compression ratio indicating unit, so that the record mode and the compression ratio selected by the operation unit 21 are indicated. Note that the imaging circuit 14, the image signal processing circuit 15, the image signal compression-expansion circuit 17, the IC memory card control circuit 18, the power supply circuit 23, the indication unit 22 and the slot units 31, 32 and 33 are all controlled by the system control circuit 11.

Figure 2A:
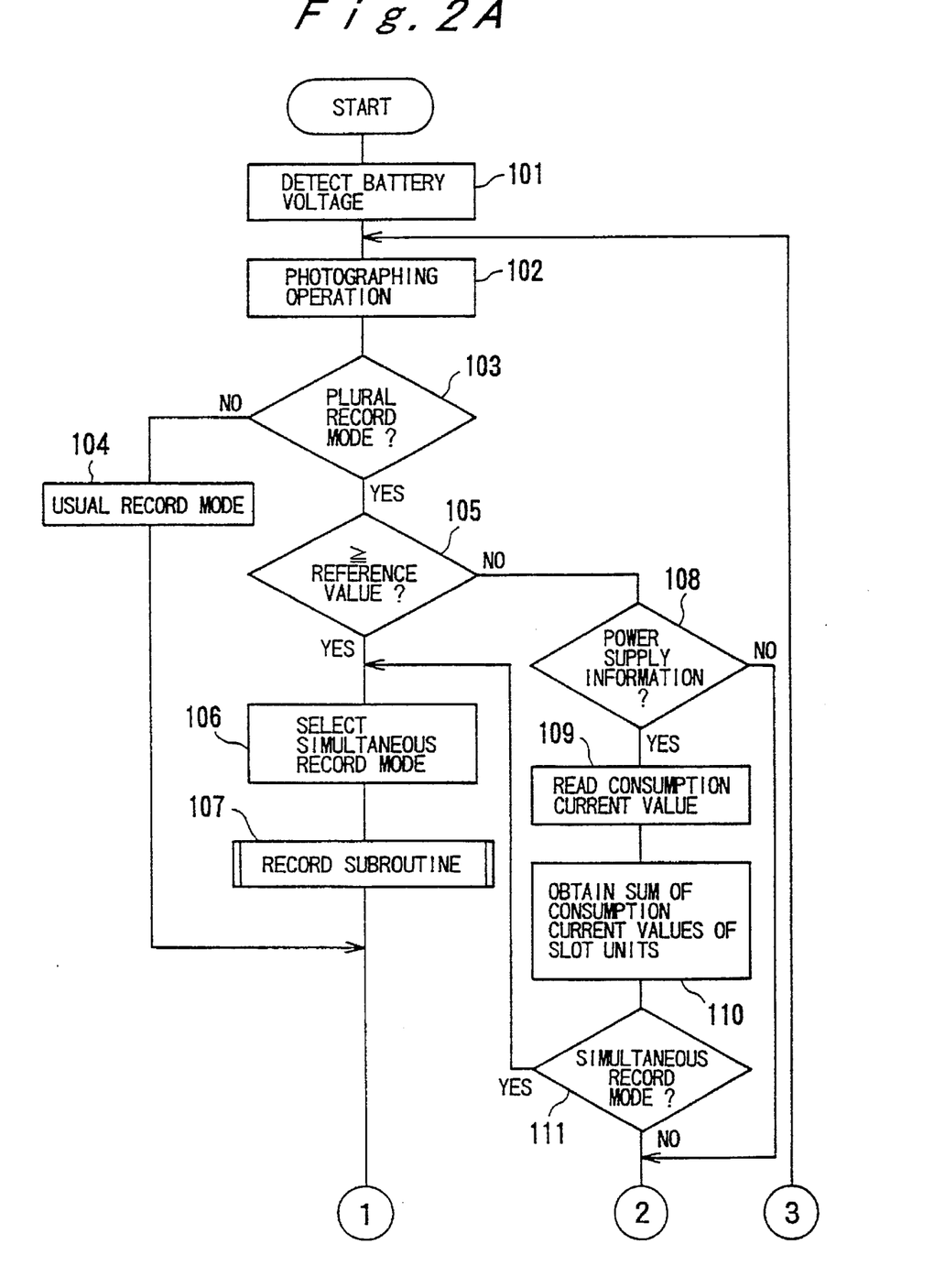
FIG. 2A is the first part of a flowchart of a program executing an operation in which an image signal is recorded to IC memory cards used with the embodiment of FIG. 1.
Figure 2B:
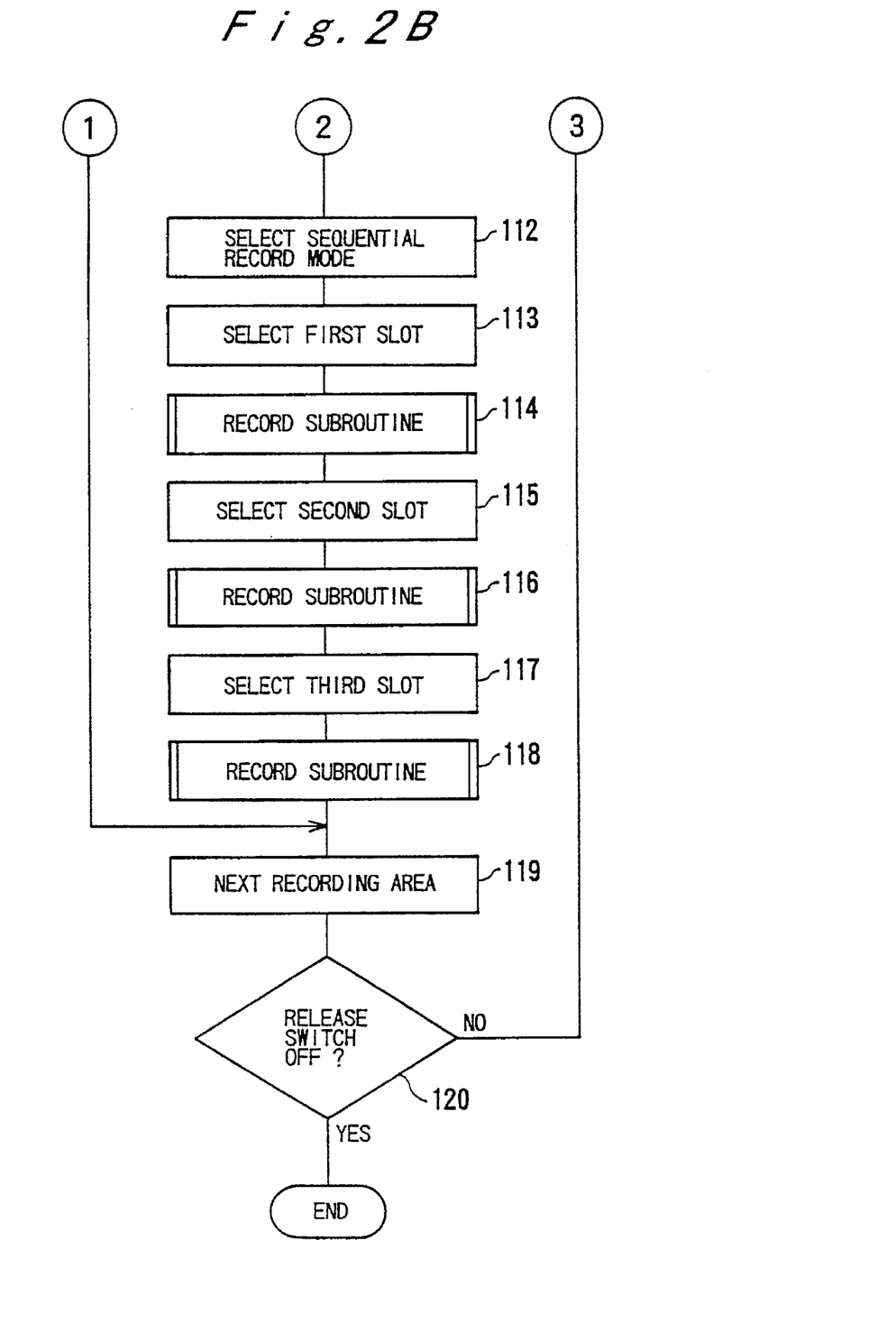
FIG. 2B is the second part of the flowchart shown in FIG. 2A.

With reference to FIGS. 2A and 2B showing a flowchart, the operation in which an image signal is recorded to the IC memory card 41, 42 and/or 43 will now be described. The program shown by the flowchart is executed by the system control circuit 11, and the flowchart in FIGS. 2A and 2B is started when the release button of the operation unit 21 is pressed so that a release switch (not shown) is turned on.

In Step 101, the output voltage of the battery 24 is detected. In Step 102, the photographing operation is carried out. Namely, an image signal read from the CCD 13 by the imaging circuit 14 is converted to a luminous signal Y and differential color signals Pr and Pb by the image signal processing circuit 15, and then stored in the image memory 16. In Step 103, it is determined whether the usual record mode or the plural record mode has been selected by the operation unit 21.

When the usual record mode is selected, the process goes to Step 104 so that the usual record mode is executed, and thus, the compressed image signals Y, Pr and Pb are recorded by one of the IC memory cards 41, 42 or 43. When the recording operation is complete, the next recording area of the IC memory card is set in Step 119. Then, it is determined in Step 120 whether or not the release switch is still turned ON. If the release switch has been turned OFF, the photographing operation is ended. If the release switch is still turned ON, the process goes to Step 102, and the recording operation described above is repeated.

Conversely, when the plural record mode is selected, the process goes from Step 103 to Step 105, so that the plural record mode is carried out. In the plural record mode, by a single recording operation, the image signals corresponding to the same image will be recorded in the three IC memory cards 41, 42 and 43, respectively.

The plural record mode includes a simultaneous record mode in which the slot units 31, 32 and 33 are simultaneously operated so that the same image signal is recorded in the three IC memory cards 41, 42 and 43 at the same time, and a sequential record mode in which the slot units 31, 32 and 33 are operated sequentially so that the same image signal is recorded sequentially in the IC memory cards 41, 42 and 43. Namely, in the sequential record mode, after the first slot unit 31 is operated so that the image signals Y, Pr and Pb are recorded in the IC memory card 41, the second slot unit 32 is operated so that the image signal is then recorded in the IC memory card 42, and finally, the third slot unit 33 is operated, recording the image signals in IC memory card 43.

In the simultaneous record mode, the image signal is stored in the three IC memory cards 41, 42 and 43 in the same time as that required for storing the image signal in a single IC memory card. However, the consumption of electric current in this recording operation is very large. Therefore, when this mode is selected, if the voltage applied by the power supply circuit 23 to the slot units 31, 32 and 33 is low, the slot units 31, 32 and 33 cannot operate. Conversely, in the sequential record mode, although a longer time is needed for recording the image signals in comparison with the time needed in the simultaneous record mode, power requirements are less. If the voltage is sufficient to enable a single IC memory card to record the image signals, then it is also sufficient to enable each of the other two to record the image signal. Accordingly, the sequential record mode can be executed even when the simultaneous record mode cannot.

Note that, since the time required for recording the image signals defining one frame in an IC memory card is as little as some tens of milliseconds (msecs), even if the voltage applied to slot units 31, 32 and 33 by the power supply circuit 23 is low, a continuous record mode in which image signals are continually recorded in one of the IC memory cards frame by frame at a constant time interval can be executed.

Further note that in the plural record mode, an image signal is generated based on image data stored in image memory 16, and recorded in an IC memory card. The image data corresponding to the image signal is maintained in the image memory 16 throughout the recording operation.

In Step 105, it is determined whether the voltage applied by the power supply circuit 23 to slot units 31, 32 and 33 is greater than or equal to a reference voltage corresponding to a minimum voltage required for carrying out the simultaneous record mode. The reference voltage value is set based on a state in which the electric current required from the power supply circuit 23 is at a maximum value, i.e. at the value of voltage required for simultaneously recording an image signal in all three IC memory cards. If it is determined that the output voltage applied to the slot units 31, 32 and 33 by the power supply circuit 23 is greater than or equal to the reference voltage, i.e. if it is determined that the simultaneous record mode can be executed, then the simultaneous record mode is automatically selected in Step 106, and further, in Step 107, a record subroutine is executed, so that the same image signal is recorded simultaneously in the three IC memory cards 41, 42 and 43. Then, in Step 119, the next recording area of each the IC memory cards is set. If it is determined in Step 120 that the release switch has been turned OFF, the recording operation is stopped, and if the release switch is turned ON, the operation described above is executed repeatedly.

Conversely, when it is determined in Step 105 that the output voltage which can be applied to the slot units 31, 32 and 33 is less than the reference voltage, Steps 108 through 111 are executed, and it is again determined whether the simultaneous record mode can be carried out, based on the consumption current, the value of which is recorded as power source information included in card attribute information in the IC memory cards 41, 42 and 43. Note that, according to JEIDA (Ver. 4.2) (Japan Electronic Industries Development Association), a standard requirement of an IC memory card is that it includes power supply information included in card attribute information recorded in a prescribed format. Thus, in many cases, the required power supply information is recorded in IC memory cards.

In Step 108, it is detected whether or not the required power supply information (i.e. the consumption current value) is recorded in the card attribute information of each of the IC memory cards 41, 42 and 43. When the power supply information is not recorded in any of the IC memory cards 41, 42 and 43, the sequential record mode is selected in Step 112. Conversely, when the power supply information is recorded ill at least any one of the IC memory cards 41, 42 and 43, the consumption current value of the IC memory card in which the power supply information is recorded is read in Step 109. Then, in Step 110, the total current needed to execute a recording operation through slot units 31, 32 and 33 in the simultaneous record mode, is calculated as follows: if the power supply information is recorded or stored in all of the IC memory cards, then the total current is calculated as the sum of all of the power supply values from all cards. If one or more cards does not have the required power supply information, then the total current is calculated by multiplying the largest power supply value found in any one of the cards by the number of cards present.

In Step 111, it is determined, based on the voltage corresponding to the total current and the known output voltage which can be applied to the slot units 31, 32 and 33 by the power supply circuit 23, whether or not the simultaneous record mode can be executed. Namely, when the output voltage of power supply circuit 23 is greater than or equal to the voltage corresponding to the total current, it is determined that the simultaneous record mode can be carried out. Control passes to Step 106 where simultaneous record mode is executed. Conversely, when the output voltage is lower than the amount corresponding to the total current, it is determined that the simultaneous record mode cannot be carried out. Control passes to Step 112 where sequential record mode is executed. Further, if the power supply information is not recorded in any of the IC memory cards 41, 42 and 43, the sequential record mode is selected in Step 112.

In the sequential record mode, the first slot unit 31 is selected in Step 113. The record subroutine is executed in Step 114, so that the image signal is recorded in the IC memory card 41. Then, the second slot unit 32 is selected in Step 115, and the record subroutine is executed in Step 116, so that the same image signal is recorded in IC memory card 42. Similarly, the third slot unit 33 is selected in Step 117, and the record subroutine is executed in Step 118, so that the same image signal is recorded in IC memory card 43. In Step 119, the next recording area of each of the IC memory cards 41, 42 and 43 is set. It is determined in Step 120 whether or not the release switch has been turned OFF. If the release switch is turned off, the recording operation is ended. If not, the process goes back to Step 102, thereby repeatedly executing the recording operation.

Figure 3:
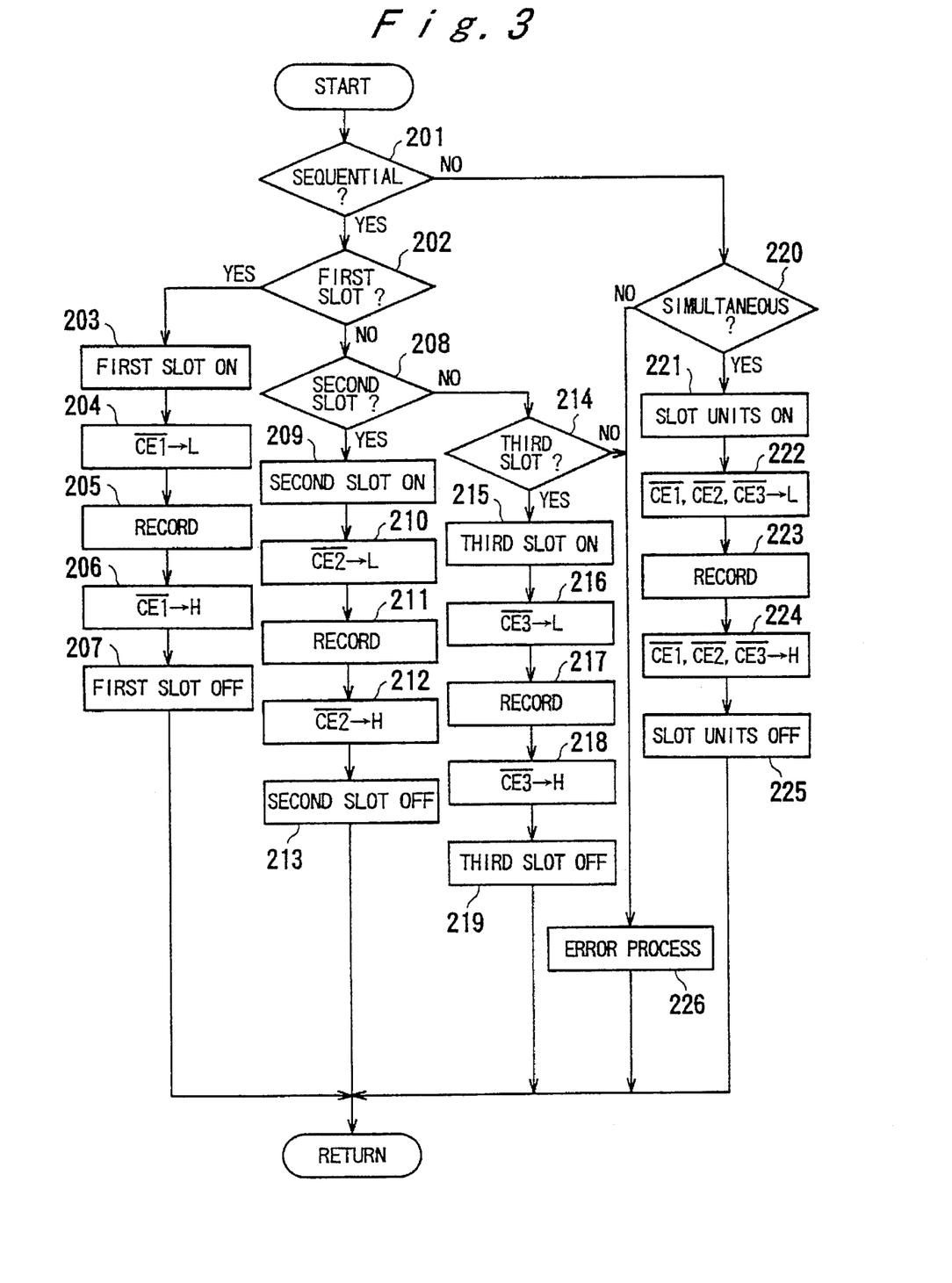
FIG. 3 is a flowchart of a record subroutine of the embodiment of FIG. 1.
Figure 4:
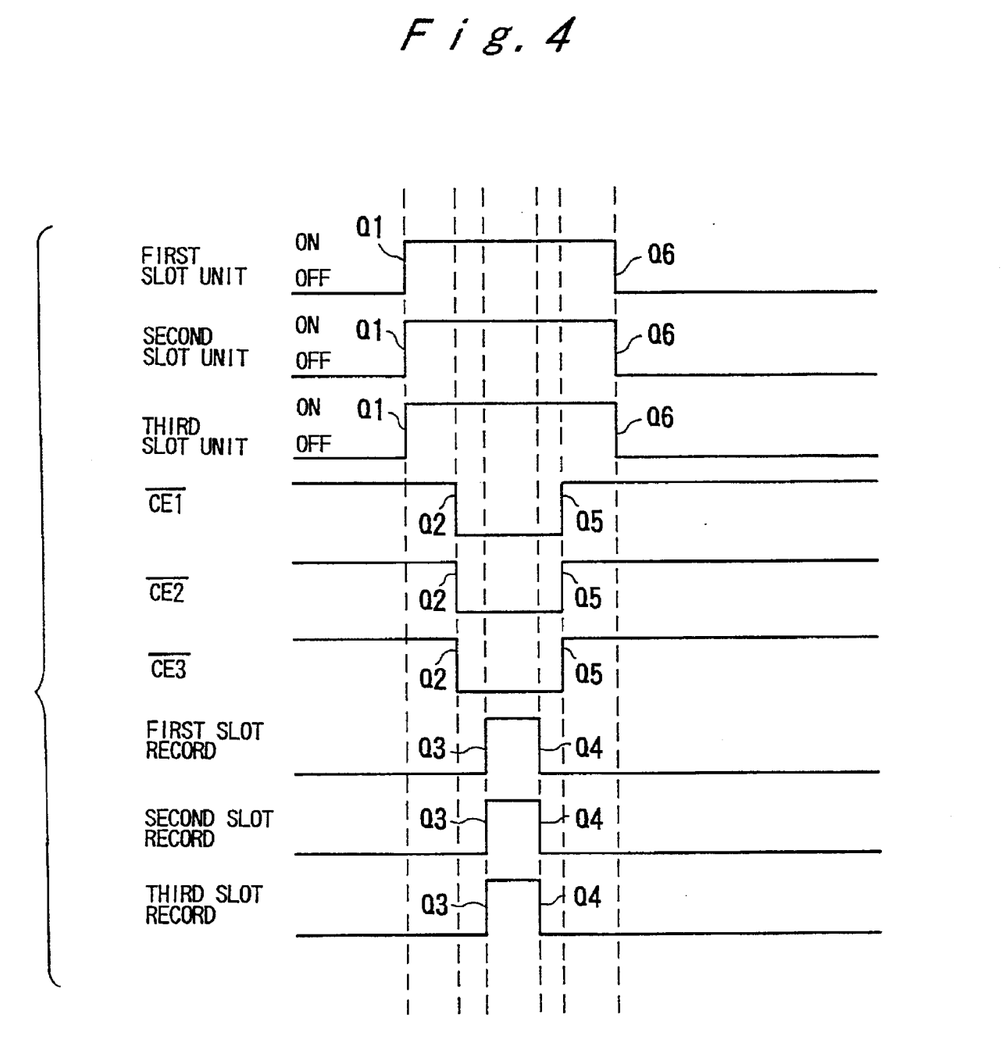
FIG. 4 is a timing chart of the operation of the record subroutine in a simultaneous record mode.

The operation of the record subroutine in the simultaneous record mode executed in Step 107 (FIG. 2A) will be described below with reference to the flowchart shown in FIG. 3 and the timing chart shown in FIG. 4.

If it is determined in Step 201 that the sequential record mode is not selected, and if it is determined in Step 220 that the simultaneous record mode is selected, then control moves to Step 221. In Step 221, the first through third slot units 31, 32 and 33 are simultaneously supplied with electric current through the power supply circuit 23 (reference Q1). In Step 222, signals $\overline{CE1}$, $\overline{CE2}$ and $\overline{CE3}$ outputted to the slot units 31, 32 and 33 are changed from H to L (reference Q2), setting the slot units 31, 32 and 33 to a state in which the IC memory cards 41, 42 and 43 can have signals recorded therein. In Step 223, the record operation is started (reference Q3). Namely, an image signal is read from the image memory 16, outputted to each of the slot units 31, 32 and 33, and recorded in each of the IC memory cards 41, 42 and 43. When the same image signal has been recorded to IC memory cards 41, 42 and 43, the record operation is complete (reference Q4). In Step 224, the signals $\overline{CE1}$, $\overline{CE2}$ and $\overline{CE3}$ are changed from L to H (reference Q5). Then, in Step 225, the power supply to slot units 31, 32 and 33 is stopped simultaneously (reference Q6). Thus, the record subroutine is ended.

Note that, if it is determined in Step 220 that the simultaneous record mode is not selected, an error process is executed in Step 226, so that an error signal is outputted to, for example, the indication unit 22.

Figure 5:
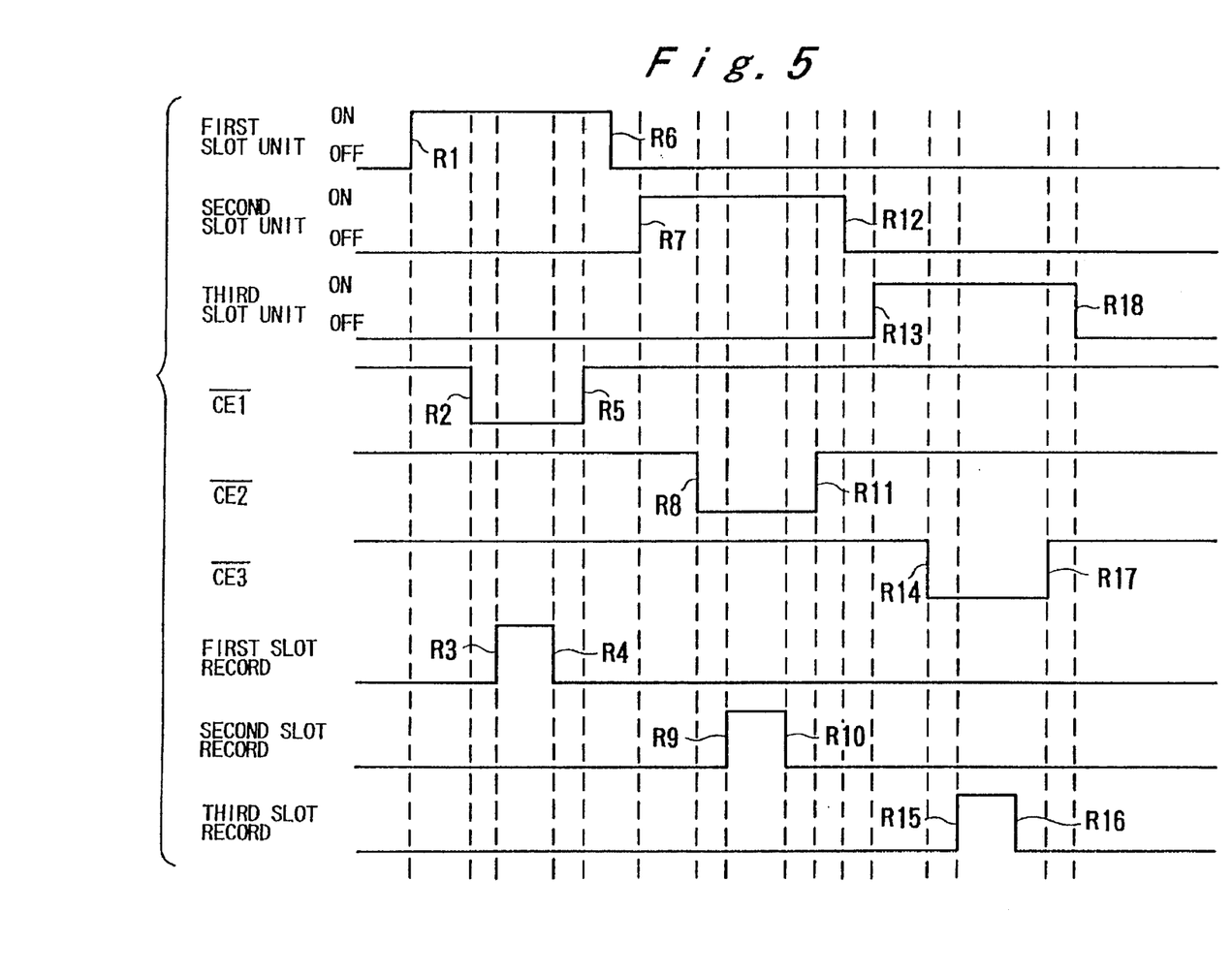
FIG. 5 is a timing chart of the operation of the record subroutine in a sequential record mode.

The operation of the record subroutine in the sequential record mode executed in Steps 114, 116 and 118 (FIG. 2B) will be described below with reference to a flowchart shown in FIG. 3 and a timing chart shown in FIG. 5.

In the flowchart shown in FIG. 2B, the first slot unit 31 is selected in Step 113. The record subroutine is called in Step 114, so that the program shown FIG. 3 is executed. In this subroutine, Steps 201 and 202 are executed, respectively, and the process moves to Step 203. In Step 203, an electric current is supplied only to the first slot unit 31 (reference R1). In Step 204, the signal $\overline{CE1}$ is changed from H to L (reference R2), so that the first slot unit 31 can be operated.

Then, in Step 205, the recording operation through the first slot unit 31 is started (reference R3), so that the image signal is recorded to IC memory card 41. When the recording operation is completed (reference R4), the signal $\overline{CE1}$ is changed from L" to H" in Step 206 (reference R5). In Step 207, the supply of electric current to the first slot unit 41 is stopped (reference R6). Namely, the record subroutine is ended, and the process returns to Step 114 of the program shown in FIG. 2B.

Next, the second slot unit 32 is selected in Step 115 (FIG. 2B), and the record subroutine is started in Step 116, so that Steps 201, 202 and 208 are executed in turn. Similar to the recording operation carried out through the first slot unit 31 described above, a recording operation is executed through the second slot unit 32. In Step 209, electric current is supplied only to the second slot unit 32 (reference R7). In Step 210, the signal $\overline{CE2}$ is changed from H to L (reference R8), enabling the recording operation through the second slot unit 32 to be executed in Step 211 (reference R9). Thus, the image signal is recorded to IC memory card 42. When the recording operation is completed (reference R10), the signal $\overline{CE2}$ outputted to the second slot unit 32 is changed from L to H in Step 212 (reference R11), the supply of electric current to the second slot unit 32 is stopped in Step 213 (reference R12), and the record subroutine is ended. Then, the process returns to Step 116 of the program shown in FIG. 2B.

Similar to the process above, the third slot unit 33 is selected in Step 117 (FIG. 2B), the record subroutine is started in Step 118, and Steps 201, 202, 208 and 214 are executed in turn. Thus an electric current is supplied only to the third slot unit 33 in Step 215 (reference R13). Next, signal $\overline{CE3}$ is changed from H to L in Step 216 (reference R14), enabling the recording operation through the third slot unit 33 to be executed in Step 217 (reference R15). Thus, the image signal is recorded to IC memory card 43. When the recording operation is completed (reference RIG), the signal $\overline{CE3}$ outputted to the third slot unit 33 is changed from L to H in Step 218 (reference R17), the supply of the electric current to the third slot unit 33 is stopped in Step 219 (reference R18), and the record subroutine is ended, and the process returns to Step 118 of the program shown in FIG. 2B.

Note that, in the recording operation described above, if none of the slot units 31, 32 or 33 is selected, the error process in Step 226 is executed, and an error indication is outputted to the indication unit 22.

According to the electronic still video camera of this embodiment, when a plurality of records of the image intended to be photographed is needed, the same images can be recorded simultaneously to a plurality of IC memory cards, to the same time as, and by the same operation as, that executed for recording one frame in a conventional electronic still video camera. Therefore, a dubbing operation need not be carried out after the photographing operation, and thus the recording operation of this embodiment is very simple.

Further, even if the voltage of the battery 24 is lowered due to consumption, and the simultaneous record mode cannot be executed, the sequential record mode is automatically selected during a photographing operation in the plural record mode, and thus, the plural record mode can be continuously executed.

A second embodiment according to the present invention will now be described with reference to FIGS. 6 through 10. The construction of the second embodiment is basically the same as that of the first embodiment, therefore only the construction and operation different from the first embodiment will be described below.

Figure 6:
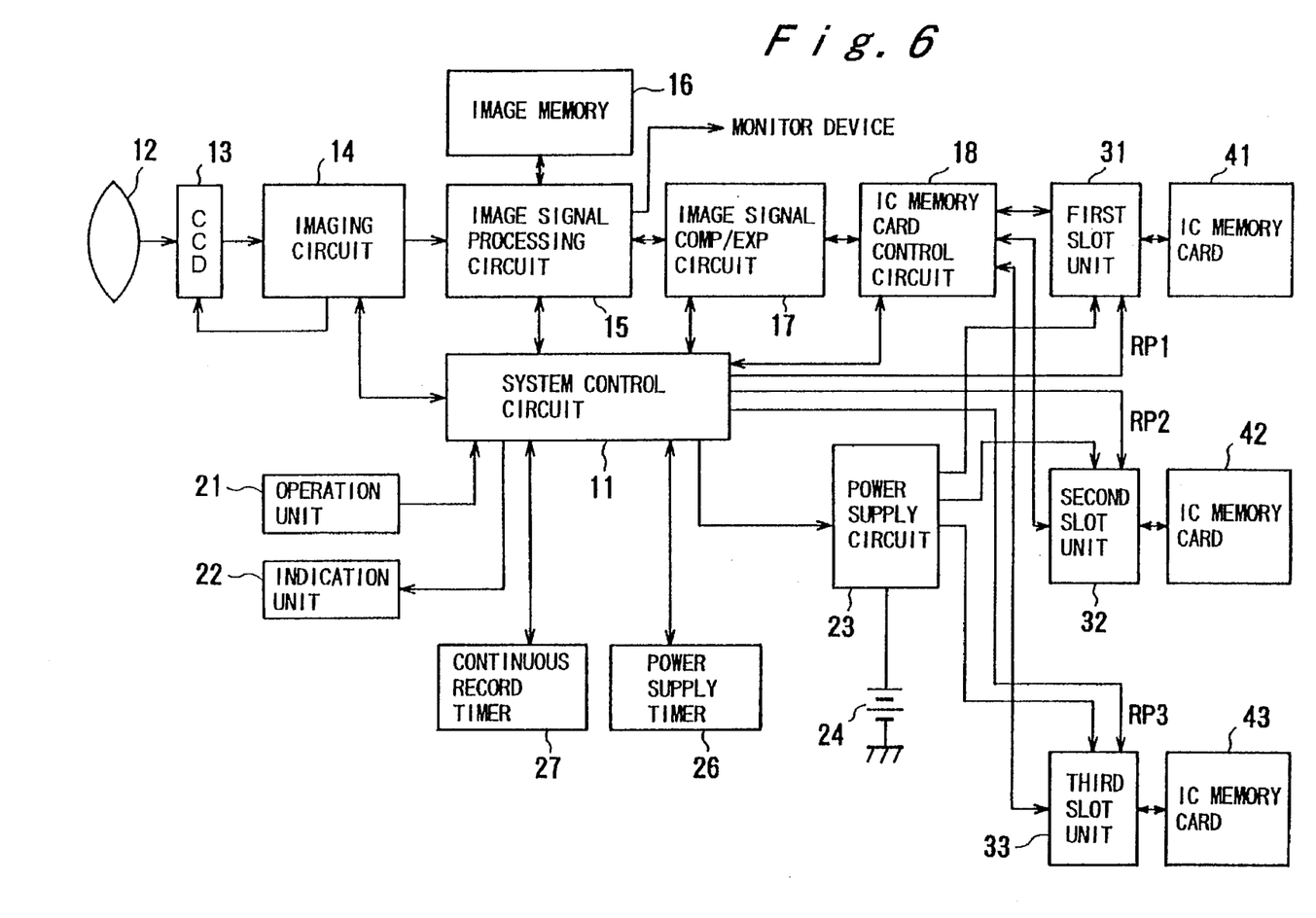
FIG. 6 is a block diagram of an electronic still video camera of a second embodiment of the present invention.

FIG. 6 is a block diagram of an electronic still video camera of a second embodiment of the present invention.

In the IC memory card control circuit 18, the remaining recordable capacity and the recorded area of the IC memory cards 41, 42 and 43 are detected, and the next record area to be used in each card is set.

In the system control circuit 11, the number of frames which can be recorded in each of the IC memory cards 41, 42 and 43 is obtained based on the compression ratio set through the operation unit 21 and the remaining recordable capacity of the IC memory cards 41, 42 and 43.

A reset pulse RP is outputted by the system control circuit 11 to the IC memory cards 41, 42 and/or 43 in which a recording operation is going to be carried out, so that the logic block in the IC memory cards 41, 42 and/or 43 is initialized. According to JEIDA, it is standard that a reset pulse is outputted to the IC memory card after the voltage of the IC memory card becomes stable, and before starting a recording operation.

A voltage outputted by the battery 24 is applied to each of the slot units 31, 32 and 33 through the power supply circuit 23. A state in which a voltage is applied to each of the slot units 31, 32 and 33 is selected by the power supply circuit 23 under control of the system control circuit 11.

The operation unit 21 includes a record mode setting switch to select a continuous record mode, in which an image signal is continually recorded to the IC memory cards 41, 42 and/or 43 frame by frame at a constant time interval, in addition to the switches provided in the first embodiment.

In the indication unit 22, the number of frames which can be recorded in the IC memory cards 41, 42 and 43 is indicated, in addition to other indications as in the first embodiment.

A power supply timer 26 is connected to the system control circuit 11 to apply a voltage to the slot units 31, 32 and 33.

A continuous record timer 27 is connected to the system control circuit 11 to carry out the continuous record mode.

Figure 7:
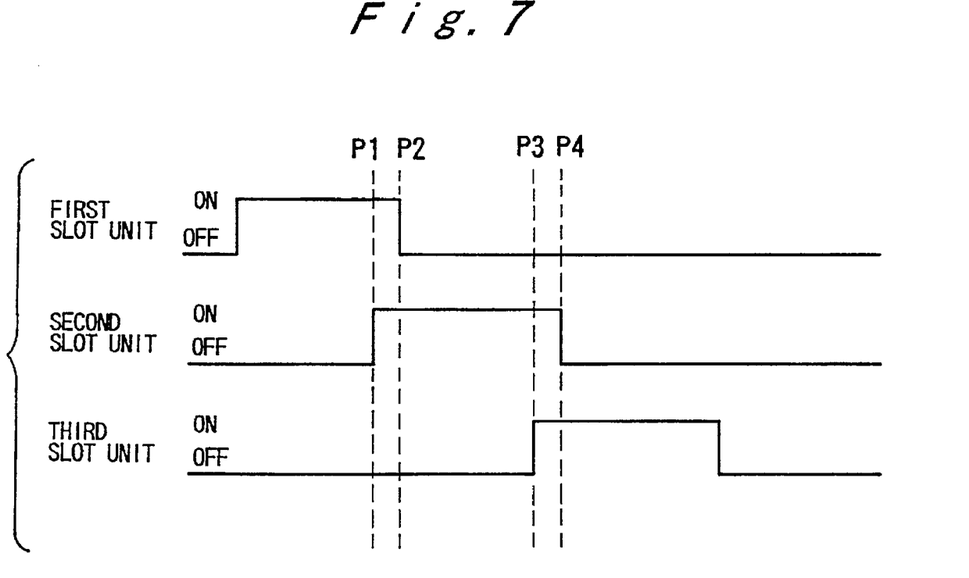
FIG. 7 is a timing chart showing a switching operation of applying a voltage to each of slot units.

FIG. 7 is a timing chart showing a switching operation of applying a voltage to each of the slot units 31, 32 and 33. With reference to FIG. 7, the switching operation in the continuous record mode of the second embodiment will be described below.

A voltage is applied to the first slot unit 31, and thus, image signals continuously outputted from the CCD 13 are recorded in IC memory card 41 frame by frame. When the remaining recordable capacity of IC memory card 41 reaches a predetermined amount (two frames, in this embodiment), a voltage is applied to the second slot unit 32 (reference P1). The predetermined amount cited above is a recording capacity corresponding to a number of frames recorded by the first slot unit 31 from when a voltage is applied to the second slot unit 32 until when the second slot unit 32 becomes able to record image signals, in the continuous record mode. When the remaining recordable capacity of IC memory card 41 is exhausted and there is no recordable capacity remaining, namely when IC memory card 41 is recorded up to the maximum capacity thereof, the voltage applied to the first slot unit 31 is stopped (reference P2). Then, subsequent image signals will be recorded in IC memory card 42 through the second slot unit 32.

Similarly, when the remaining recordable capacity of IC memory card 42 reaches the predetermined amount, a voltage is applied to the third slot unit 33 (reference P3). When IC memory card 42 has no recordable capacity remaining, the voltage applied to the second slot unit 32 is stopped (reference P4). Then, subsequent image signals will be recorded in IC memory card 43 through the third slot unit 33.

Figure 8:
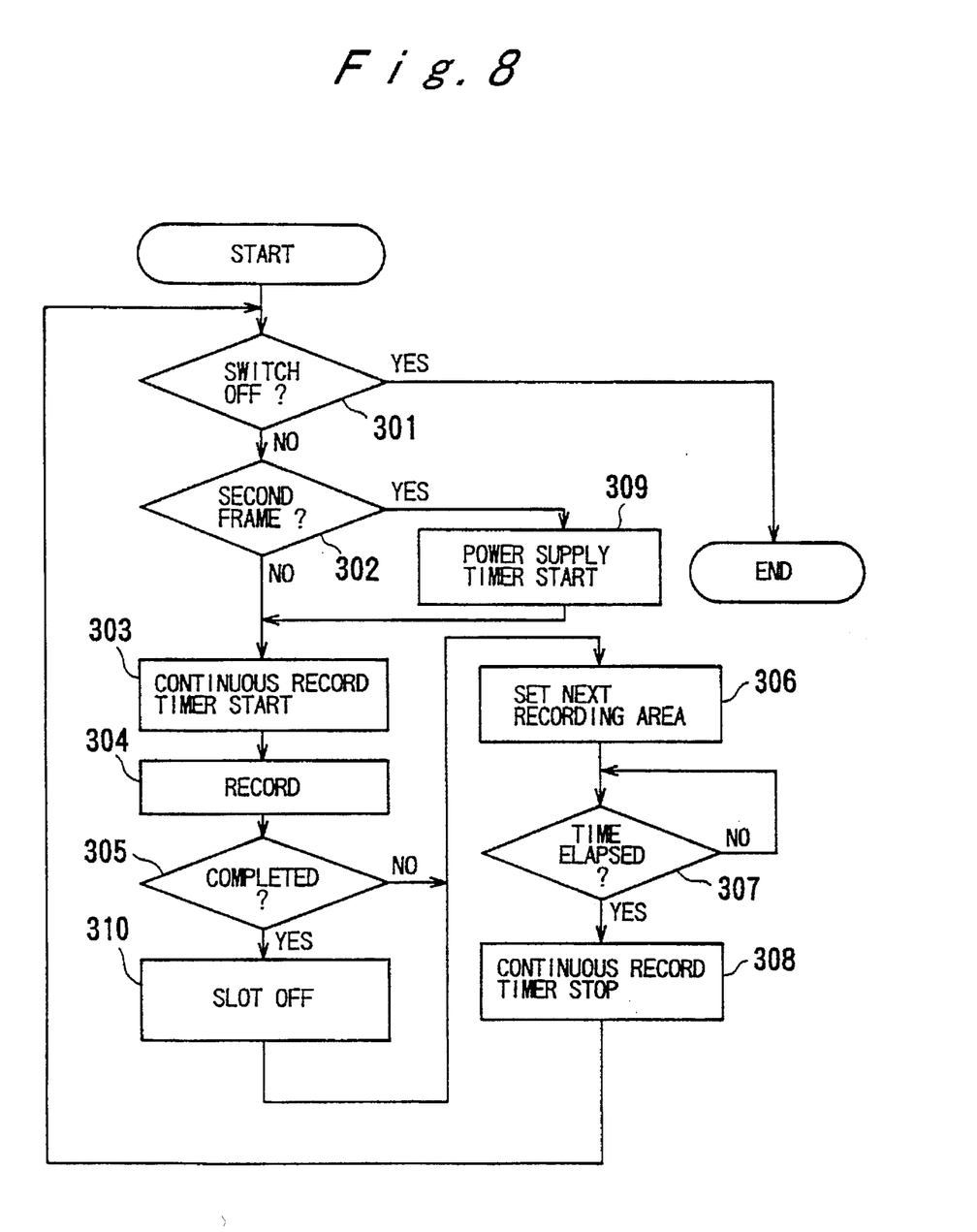
FIG. 8 is a flowchart showing a program by which a continuous record mode is carried out.

FIG. 8 is a flowchart showing a program by which the continuous record mode of the second embodiment is executed.

The program is executed by the system control circuit 11, and commences when the continuous record mode is selected and the release switch is turned ON. Note that, in this embodiment, it is presumed that each of the IC memory cards has at least two frames of recordable memory capacity remaining.

First, the recordable capacity remaining in each of the IC memory cards 41, 42 and 43 is detected therefrom, and the number of frames recordable in each IC memory card 41, 42 and 43 is calculated based on the remaining recordable capacity and the compression ratio set through the operation unit 21. Based on this result, the first slot unit in which an IC memory card having sufficient recordable capacity is mounted (i.e. having capacity for two or more frames) is selected. For example, the first slot unit 31, through which the recording operation is to be initially carried out, is selected. Then, a voltage is applied to the first slot unit 31, and a reset pulse RP1 is outputted to the IC memory card 41. As a result, the first slot unit 31 and the IC memory card 41 are reset to a recordable state in which image signals can be recorded.

In Step 301, it is determined whether or not the release switch is turned off; if so, the program is ended. If not, it is determined in Step 302 whether the recording area which is going to be used corresponds to the next to last remaining frame, i.e. whether there remains for example recordable capacity for 3 or more frames in the IC memory card which is now going to be recorded to. Since in this embodiment, it is supposed that the remaining recordable capacity of each IC memory card corresponds to two or more frames, the process goes to Step 303, and the continuous record timer 27 is started.

Then, in Step 304, a recording operation is carried out. Namely, the image signal is read out from the CCD 13, converted to a predetermined format in the image signal processing circuit 15, outputted to the first slot unit 31 through the image signal compression-expansion circuit 17 and the IC memory card control circuit 18, and recorded in the IC memory card 41.

When the recording operation for recording an image signal corresponding to one frame is completed in Step 304, the process goes to Step 305. In Step 305, it is determined whether the capacity of IC memory card 41 mounted in the first slot unit 31 has been exhausted, i.e. whether or not IC memory card 41 has remaining recordable capacity. If IC memory card 41 has recordable capacity remaining, the process goes to Step 306, so that the next recording area in IC memory card 41 is set.

In Step 307, it is determined whether a set time (0.1 sec, for example) has elapsed since the continuous record timer 27 was started. The time interval between two frames is controlled to a constant value and still image signals are read from the CCD 13 at an equal time interval by this set time.

When the set time has elapsed, the continuous record timer 27 is stopped in Step 308. Then, the process goes to Step 301, and the operations of Steps 301 through 308 are repeated, so that the still image signals obtained at a constant time interval are recorded in the IC memory card 41.

As a result of carrying out the continuous record operation, if it is determined in Step 302 that the recordable capacity remaining corresponds to only two frame's worth, the power supply timer 26 is started in Step 309.

Figure 9:
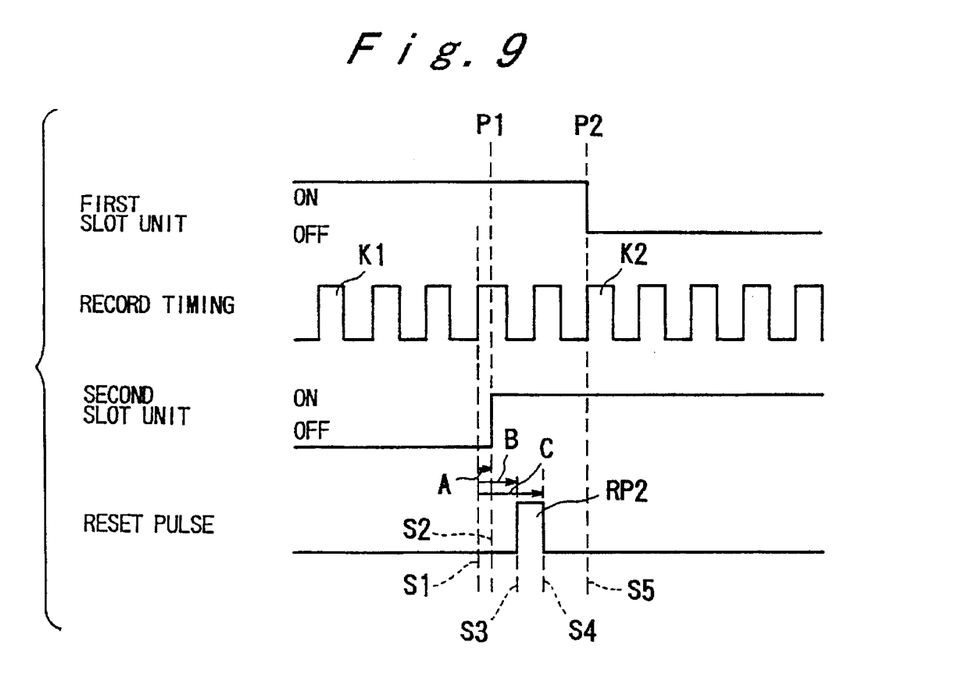
FIG. 9 is a timing chart showing a switching of a power supply from a first slot unit to a second slot unit; and, FIG. 10 is a flowchart of a program by which the switching operation is carried out.
Figure 10:
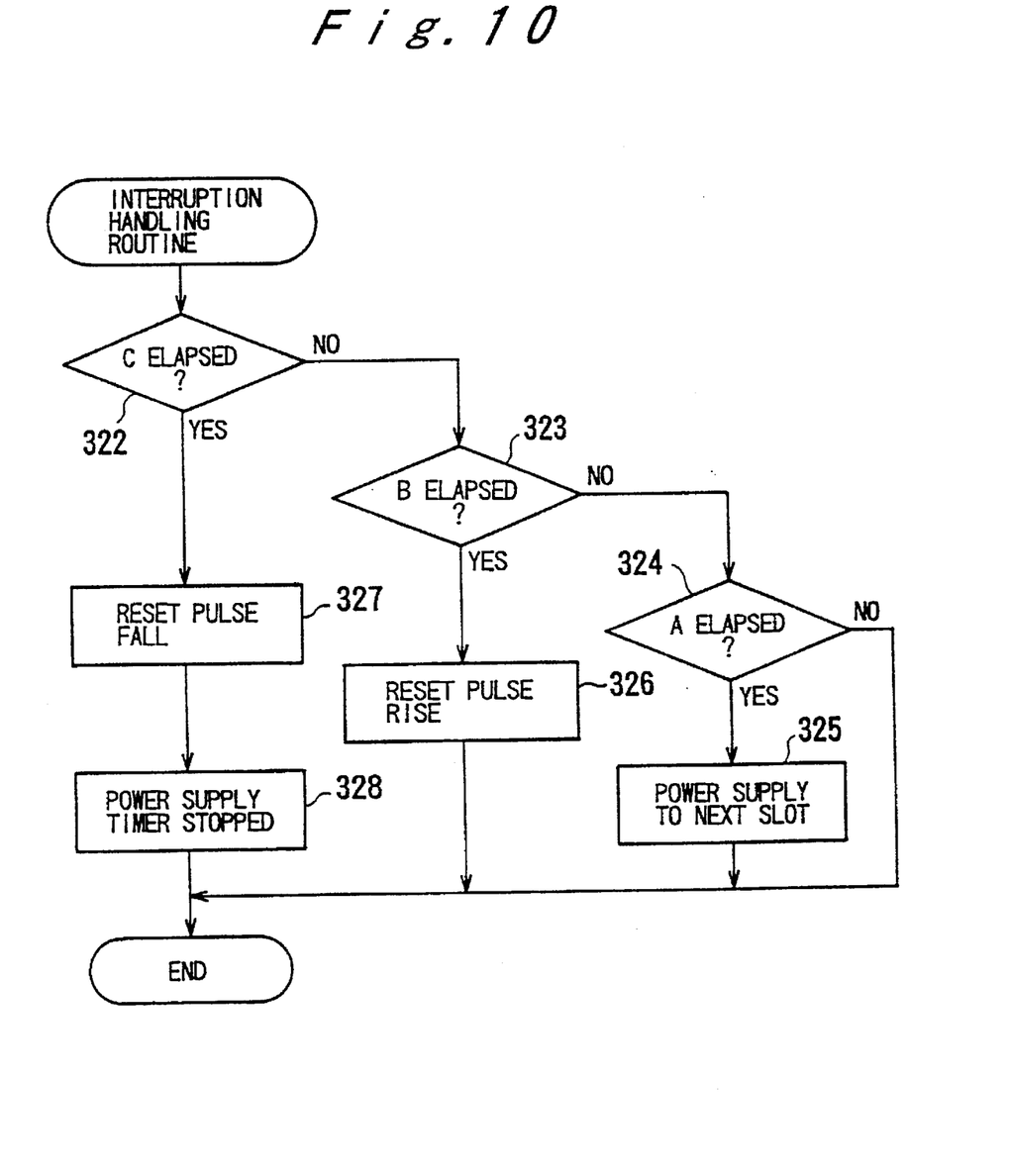

FIG. 9 is a timing chart showing a switching operation of the power supply from the first slot unit 31 to the second slot unit 32, and FIG. 10 is a flowchart of a program by which the switching operation is carried out.

With reference to these drawings, the switching operation will be described. Note that the interruption handling routine shown in FIG. 10 is executed by the system control circuit 11, at a constant time interval after the power supply timer 26 is started (reference S1 in FIG. 9). Note that, in FIGS. 9 and 10, the timings are inter-related such that A<B<C.

First, it is determined in Step 322 whether or not time C has elapsed. If not, it is determined in Step 323 whether or not time B elapsed, and if not, the process goes to Step 324. When it is determined in Step 324 that time A has elapsed, a voltage is applied to the second slot unit 32 in which the recording operation is then to be carried out (reference S2 in FIG. 9), and this routine is ended.

The second slot unit 32 does not immediately become usable after the voltage is applied thereto, and a period of time (rising time) is required until the voltage stabilizes and the slot unit 32 becomes usable. When the interruption handling routine is next entered, if it is determined in Step 323 that time B has elapsed, it is therefore deemed that the rising time has elapsed. Then, the process goes to Step 326, where the reset pulse RP2 is outputted to the second slot unit 32 (reference S3 in FIG. 9), and this routine is ended. When the interruption handling routine is next entered, if it is determined in Step 322 that time C has elapsed, then in Step 327 (reference S4 in FIG. 9) the reset pulse RP2 falls. Thus, the logic block of the IC memory card 42 is initialized, and the second slot unit 32 is reset to a usable state. Then, in Step 328, the power supply timer 26 is stopped, and this routine is ended.

While the power supply switch program is being executed as described above, Steps 301 through 308 are repeatedly executed, so that the image signal is recorded in the remaining two frames of the first IC memory card 41. When the number of remaining frames of IC memory card 41 becomes zero (reference S5 in FIG. 9), it is determined in Step 305 that the recording operation through slot unit 31 is complete, and the power supply to the slot unit 31 is turned OFF in Step 310.

In Step 306, the IC memory card 42, to which the next image signal will be recorded, has the next recording area therein set. Then, Steps 307, 308, 301, 302 and 303 are executed in turn, so that the next image signal is recorded in the IC memory card 42 (reference K2 in FIG. 9).

Similarly, when the number of frames recordable in IC memory card 42 becomes two, the power supply timer 26 is started, and thus, a voltage is applied to the third slot unit 33, so that the third slot unit 32 is reset to a usable state. Then, when the frames remaining in IC memory card 42 become zero, the next image signal is recorded in IC memory card 43.

If it is determined in Step 301 that the release switch has been turned OFF, the subroutine will be terminated, so ending the continuous recording.

Note that, in the continuous record mode, the predetermined value upon which the start timing of the power supply timer 26 is determined is set in accordance with the period required for the voltage of the next slot unit to become stable, and is not restricted to a period corresponding to two frames.

Time A corresponds to the difference between the period required for recording two frame's worth of signals and the period until the next slot unit attains a usable state. In providing this time A, consumption of the battery 24 is reduced.

In the electronic still video camera described above, a voltage is sequentially applied to the slot unit through which a recording operation is to be carried out, in the continuous record mode. Therefore, in comparison with a conventional device in which a voltage is always applied to all the slot units, consumption of the battery 24 is greatly reduced. Accidents do not occur, whereby the battery 24 is exhausted during photography, rendering the continuous record mode or any other recording impossible.

As electronic still video cameras have fewer mechanical parts than usual optical cameras, they avoid the speed limitations inherent in such optical cameras and can carry out high speed continuous photography. Furthermore, in electronic still video cameras that utilize IC memory cards instead of floppy disks, the time necessary to switch over from one full IC memory card to the next is reduced because no mechanical handling of floppy disks is required, contributing to a faster continuous recording operation speed.

Nonetheless, usual electronic still video cameras do not maximize their continuous recording operation speed because they must accommodate the rising time required to set the next IC memory card to a recordable state once a first IC memory card has reached maximum capacity. This is less of a problem at slow continuous recording operation speeds, but it becomes very limiting as higher continuous recording operation speeds are desired for recording images closer and closer together. The reset pulse, standardized according to JEIDA, is another frustrating limitation as it requires a fixed irreducible period of time to initialize the logic block of an IC memory card. Therefore the time interval between recordings may be expanded, but not reduced.

Conversely, in this embodiment, the voltage necessary to set a second IC memory card to a recordable state is originated when the remaining recordable capacity of a first IC memory card reaches a predetermined state, in sufficient time for the second card to be fully ready to record image signals just as the first card reaches full capacity. Therefore, a power supply battery need not supply high power simultaneously to both IC memory cards for a long time, hence greatly reducing battery consumption. In addition, the time interval between successive image recording operations is kept constant, so that excellent, high-speed successive images may be obtained by the continuous record mode.

Note that, although the electronic still video camera has three slot units 31, 32 and 33 in each of the above embodiments, the number of slot units may be two or four.

Further, the recording medium may be a magnetic disk, or a magneto-optical disk.

Still further, the speed of the continuous recording operation can be arbitrarily chosen by an operator depending on selections made at the operation unit 21, although the speed is set to be constant in the electronic still video camera in each of the above embodiments. To vary the speed, the time at which the power supply timer 26 is started can be changed by adjusting the set time interval between frames.

Although the embodiments of the present invention have been described herein with reference to the accompanying drawings, it is obvious that many modifications and changes may be made by those skilled in the art without departing from the scope of the invention.

The present disclosure relates to subject matter contained in Japanese Patent Application Nos. HEI 6-41869 (filed on Feb. 16, 1994) and HEI 6-49716 (filed on Feb. 23, 1994) which are expressly incorporated herein, by reference, in their entirety.

I claim:

1. A device for controlling a recording operation of a still video camera in which a plurality of recording mediums can be mounted, said device comprising:

means for recording an image signal corresponding to an object to at least one of said plurality of recording mediums; and means for controlling said recording means, by a single recording operation, in accordance with a single record mode, in which said image signal is recorded to one of said plurality of recording mediums, or a plural record mode, in which said image signal is identically recorded in said plurality of recording mediums.

2. A device according to claim 1, wherein said recording means records said image signal simultaneously to said plurality of recording mediums when said still video camera is set to said plural record mode.

3. A device according to claim 1, wherein said recording means records said image signal sequentially to said plurality of recording mediums when said still video camera is set to said plural record mode.

4. A device according to claim 1, further comprising means for sensing an output voltage of a power source applying said output voltage to said recording means, said control means controlling said recording means in accordance with said output voltage.

5. A device according to claim 4, wherein said plural record mode includes a simultaneous record mode in which said recording means records said image signal to said plurality of recording mediums at the same time, and a sequential record mode in which said recording means records said image signal sequentially to said plurality of recording mediums, said control means setting said simultaneous record mode when said output voltage is at least equal to a reference voltage, and setting said sequential record mode when said output voltage is less than said reference voltage.

6. A device according to claim 5, further comprising:

means for detecting a consumption current required for recording said image signal to each of said plurality of recording mediums;

means for calculating a sum of each of said consumption currents, said control means setting said simultaneous record mode or said sequential record mode in accordance with said sum of each of said consumption currents.

7. A device according to claim 6, wherein said control means sets said simultaneous record mode when said output voltage is at least equal to an amount corresponding to said sum, and sets said sequential record mode when said output voltage is less than an amount corresponding to said sum.

8. A device according to claim 6, wherein said recording mediums are of the same type.

9. A device according to claim 1, wherein said recording medium is selectively attachable to and detachable from said still video camera.

10. A device for controlling a recording operation of a still video camera, said device comprising:

a plurality of slot units, a recording medium being mountable in each slot unit; and a control unit that controls said plurality of slot units to record an image signal corresponding to an object to at least one recording medium, said control unit actuating one of said plurality of slot units to record said image signal to one recording medium, or actuating more than one slot unit to record said image signal to more than one recording medium.

* * * * *